(12) United States Patent
Ho et al.

(10) Patent No.: US 10,048,547 B2
(45) Date of Patent: Aug. 14, 2018

(54) DISPLAY DEVICE

(71) Applicant: Innolux Corporation, Miao-Li County (TW)

(72) Inventors: Yu-Sheng Ho, Miao-Li County (TW); Hsueh-Wen Li, Miao-Li County (TW); Mao-Shiang Lin, Miao-Li County (TW); Ying-Jen Chen, Miao-Li County (TW)

(73) Assignee: Innolux Corporation, Miao-Li County (TW)

( * ) Notice: Subject to any disclaimer, the term of this patent is extended or adjusted under 35 U.S.C. 154(b) by 64 days.

(21) Appl. No.: 15/372,397

(22) Filed: Dec. 8, 2016

(65) Prior Publication Data

US 2017/0184927 A1 Jun. 29, 2017

(30) Foreign Application Priority Data

Dec. 29, 2015 (CN) .......................... 2015 1 1006036

(51) Int. Cl.
*G02F 1/1362* (2006.01)
*G02F 1/1343* (2006.01)
*G02F 1/1337* (2006.01)
*G02F 1/137* (2006.01)
*G02F 1/1333* (2006.01)

(52) U.S. Cl.
CPC .... *G02F 1/134309* (2013.01); *G02F 1/13439* (2013.01); *G02F 1/133371* (2013.01); *G02F 1/133707* (2013.01); *G02F 1/136286* (2013.01); *G02F 1/137* (2013.01); *G02F 1/1343* (2013.01); *G02F 1/133345* (2013.01); *G02F 2001/134345* (2013.01); *G02F 2201/121* (2013.01); *G02F 2201/123* (2013.01); *G02F 2201/40* (2013.01)

(58) Field of Classification Search
CPC ......... G02F 1/134309; G02F 1/136286; G02F 1/13439
See application file for complete search history.

(56) References Cited

U.S. PATENT DOCUMENTS

| 2009/0128765 | A1 | 5/2009 | Park |
| 2011/0317104 | A1 | 12/2011 | Nakamura et al. |
| 2014/0320794 | A1 | 10/2014 | Liao et al. |
| 2015/0103281 | A1 | 4/2015 | Shin et al. |

OTHER PUBLICATIONS

"Search Report of European Counterpart Application," dated Apr. 6, 2017, p. 1-p. 11.

*Primary Examiner* — Joseph L Williams
(74) *Attorney, Agent, or Firm* — JCIPRNET

(57) ABSTRACT

The disclosure provides a display device. The pixel electrode of the display device includes a first pixel electrode and a second pixel electrode having the same electric potential. The first interlayer is formed between the first substrate and the first pixel electrode. Adjacent two of the first strip-shaped branches of the first interlayer form a first gap to expose part of the first substrate. The common electrode layer is disposed over the second substrate. The pixel electrode is positioned between the first substrate and the display medium layer. The first pixel electrode extends to cover the first gap. A difference between a maximum distance between the first pixel electrode and the common electrode layer and a maximum distance between the second pixel electrode and the common electrode layer is 0.1 μm to 0.4 μm.

18 Claims, 6 Drawing Sheets

डISPLAY DEVICE

DISPLAY DEVICE

CROSS-REFERENCE TO RELATED APPLICATION

This application claims the priority benefit of China application serial no. 201511006036.1, filed on Dec. 29, 2015. The entirety of the above-mentioned patent application is hereby incorporated by reference herein and made a part of this specification.

BACKGROUND OF THE INVENTION

Field of the Invention
The invention relates to a display device.
Description of Related Art
Nowadays, the market demands the liquid crystal display device to develop its functions towards high contrast ratio, no gray scale inversion, low color shift, high luminance, full color, high color saturation, high response speed, and a wide viewing angle. Currently, the technologies capable of meeting the requirement of a wide viewing angle include the twist nematic (TN) liquid crystal having a wide viewing film, the in-plane switching (IPS) liquid crystal display device, the fringe field switching liquid crystal display device, and the multi-domain vertical alignment (MVA) liquid crystal display device. However, when viewing a vertical alignment liquid crystal display device, due to the birefringence properties of liquid crystal molecules, there exists a phenomenon where colors seen from a side viewing angle are different from those seen from a direct viewing angle; namely, a phenomenon of color shift occurs.

The technology of Low color shift is developed for solving this problem, different voltages separately provided to two separate pixel electrodes in a the sub-pixel area, at least one more transistor is need to control the pixel electrodes, as a result, a tilt degree of liquid crystal molecules driven by the separate pixel electrodes are also different to mitigate the issues of color shift and insufficient color saturation. However, such design increases a number of the thin film transistors and meanwhile increases a number of the scan lines. It not only increases a probability of lowering the process yield rate, but also lowers the aperture rate of the liquid crystal display device.

SUMMARY

The disclosure provides a display device capable of solving issues of a low process yield rate or a low aperture ratio in the current wide viewing angle technology.

According to one embodiment of the disclosure, the display device includes a first substrate, at least two scan lines, at least two data lines, at least a pixel electrode, at least an active component, a first interlayer, a second substrate, a common electrode layer, and a display medium layer. The scan lines, the data lines, the pixel electrode, and the active component are disposed over the first substrate. Adjacent two of the scan lines and adjacent two of the data lines intersect to define a sub-pixel area. The active component is electrically connected to one of the scan lines. The pixel electrode is electrically connected to the active component. The pixel electrode includes a first pixel electrode and a second pixel electrode having the same electric potential. The first interlayer is formed between the first substrate and the first pixel electrode of the pixel electrode. The first interlayer includes a plurality of first strip-shaped branches. Adjacent two of the first strip-shaped branches form a first gap to expose part of the first substrate. The common electrode layer is disposed over the second substrate. The display medium layer is disposed between the first substrate and the second substrate. The pixel electrode is positioned between the first substrate and the display medium layer. The first pixel electrode extends to cover the first gap. A maximum vertical distance between the first pixel electrode and the common electrode layer is a first distance. A maximum vertical distance between the second pixel electrode and the common electrode layer is a second distance. A difference between the first distance and the second distance is 0.1 μm to 0.4 μm.

In the display device according to one embodiment of the disclosure, the second pixel electrode includes a plurality of second strip-shaped branches, wherein adjacent two of the strip-shaped branches form a second gap.

In the display device according to one embodiment of the disclosure, the display device further includes a second interlayer disposed between the first substrate and the second pixel electrode.

In the display device according to one embodiment of the disclosure, the second gap exposes part of the second interlayer.

In the display device according to one embodiment of the disclosure, a material of at least one of the first interlayer and the second interlayer is identical to a material of the pixel electrode.

In the display device according to one embodiment of the disclosure, the material of at least one of the first interlayer and the second interlayer is an insulating material.

In the display device according to one embodiment of the disclosure, the first interlayer further includes a first main trunk and a second main trunk, the first main trunk and the second main trunk intersects. Each of the first strip-shaped branches connects to one of the first main trunk and the second main trunk. An included angle between one of the first strip-shaped branches and one of the first main trunk and the second main trunk is between 25° and 65°.

In the display device according to one embodiment of the disclosure, the second pixel electrode includes a third main trunk and a fourth main trunk. The third main trunk and the fourth main trunk intersects. Each of the second strip-shaped branches connects to one of the third main trunk and the fourth main trunk. An included angle between one of the second strip-shaped branches and one of the third main trunk and the fourth main trunk is between 25° and 65°.

In the display device according to one embodiment of the disclosure, the first pixel electrode directly connects to the second pixel electrode.

In the display device according to one embodiment of the disclosure, the first interlayer comprises a sidewall and a bottom surface connected to the sidewall. An included angle between the sidewall and the bottom surface being between 40° and 90°.

According to another embodiment of the disclosure, the display device includes a first substrate, at least two scan lines, at least two data lines, at least a pixel electrode, at least an active component, a first interlayer, a second substrate, a common electrode layer, and a display medium layer. The scan lines, the data lines, the pixel electrode, and the active component are disposed over the first substrate. Adjacent two of the scan lines and adjacent two of the data lines intersect to define a sub-pixel area. The active component is electrically connected to one of the scan line. The pixel electrode is electrically connected to the active component. The pixel electrode includes a first pixel electrode and a second pixel electrode having the same electric potential.

The first interlayer is formed between the first substrate and the first pixel electrode of the pixel electrode. The first interlayer includes a plurality of first strip-shaped branches. Adjacent two of the first strip-shaped branches form a first gap to expose part of the first substrate. The common electrode layer is disposed over the second substrate. The display medium layer is disposed between the first substrate and the second substrate. The pixel electrode is positioned between the first substrate and the display medium layer. The first pixel electrode extends to cover the first gap. The second pixel electrode includes a plurality of second strip-shaped branches. Adjacent two of the second strip-shaped branches form a second gap. A minimum distance between the first pixel electrode and the common electrode layer is a third distance. A minimum distance between the second pixel electrode and the common electrode layer is a fourth distance. The third distance is different from the fourth distance.

In the display device according to one embodiment of the invention, a difference between the third distance and the fourth distance is 0.1 μm to 0.4 μm.

In the display device according to one embodiment of the invention, the second gap is between 3 μm and 10 μm.

In the display device according to one embodiment of the invention, a thickness of the first interlayer is between 0.1 μm and 0.4 μm.

In the display device according to one embodiment of the disclosure, the first interlayer includes a sidewall and a bottom surface connected to the sidewall. An included angle formed between the sidewall and the bottom surface is between 40° and 90°.

In the display device according to one embodiment of the disclosure, the first interlayer further includes a first main trunk and a second main trunk. The first main trunk and the second main trunk intersects. Each of the first strip-shaped branches connects to one of the first main trunk and the second main trunk. An included angle between one of the first strip-shaped branches and one of the first main trunk and the second main trunk is between 25° and 65°.

In the display device according to one embodiment of the disclosure, the second pixel electrode includes a third main trunk and a fourth main trunk. The third main trunk and the fourth main trunk intersects. Each of the second strip-shaped branches connects to one of the third main trunk and the fourth main trunk. An included angle between one of the second strip-shaped branches and one of the third main trunk and the fourth main trunk is between 25° and 65°.

In the display device according to one embodiment of the disclosure, the first pixel electrode directly connects to the second pixel electrode.

In light of the above, the pixel electrode (include first pixel electrode and second pixel electrode) of the display device of the disclosure has substantially the same electric potential. However, through the design of the interlayer, the distance between the first pixel electrode of the pixel electrode and the common electrode layer is different from the distance between the second pixel electrode of the pixel electrode and the common electrode layer. Accordingly, without increasing a number of the active component, brightness presented by the first pixel electrode and by the second pixel electrode can still be different to mitigate the issues of color shift and insufficient color saturation. Thereby, the process yield rate or the aperture ratio of the display device can be improved.

DESCRIPTION OF THE EMBODIMENTS

Figure 1:
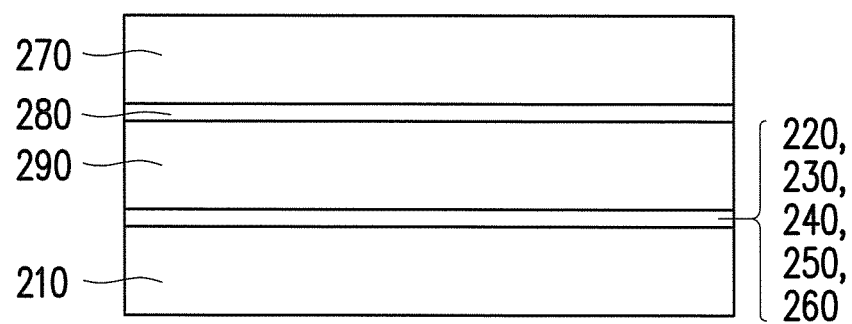
FIG. 1 is a cross-sectional simplified schematic view of a display device according to one embodiment of the disclosure.

Reference will now be made in detail to the exemplary embodiments of the disclosure, examples of which are illustrated in the accompanying drawings. Wherever possible, the same reference numbers are used in the drawings and the description to refer to the same or like parts.

Figure 2:
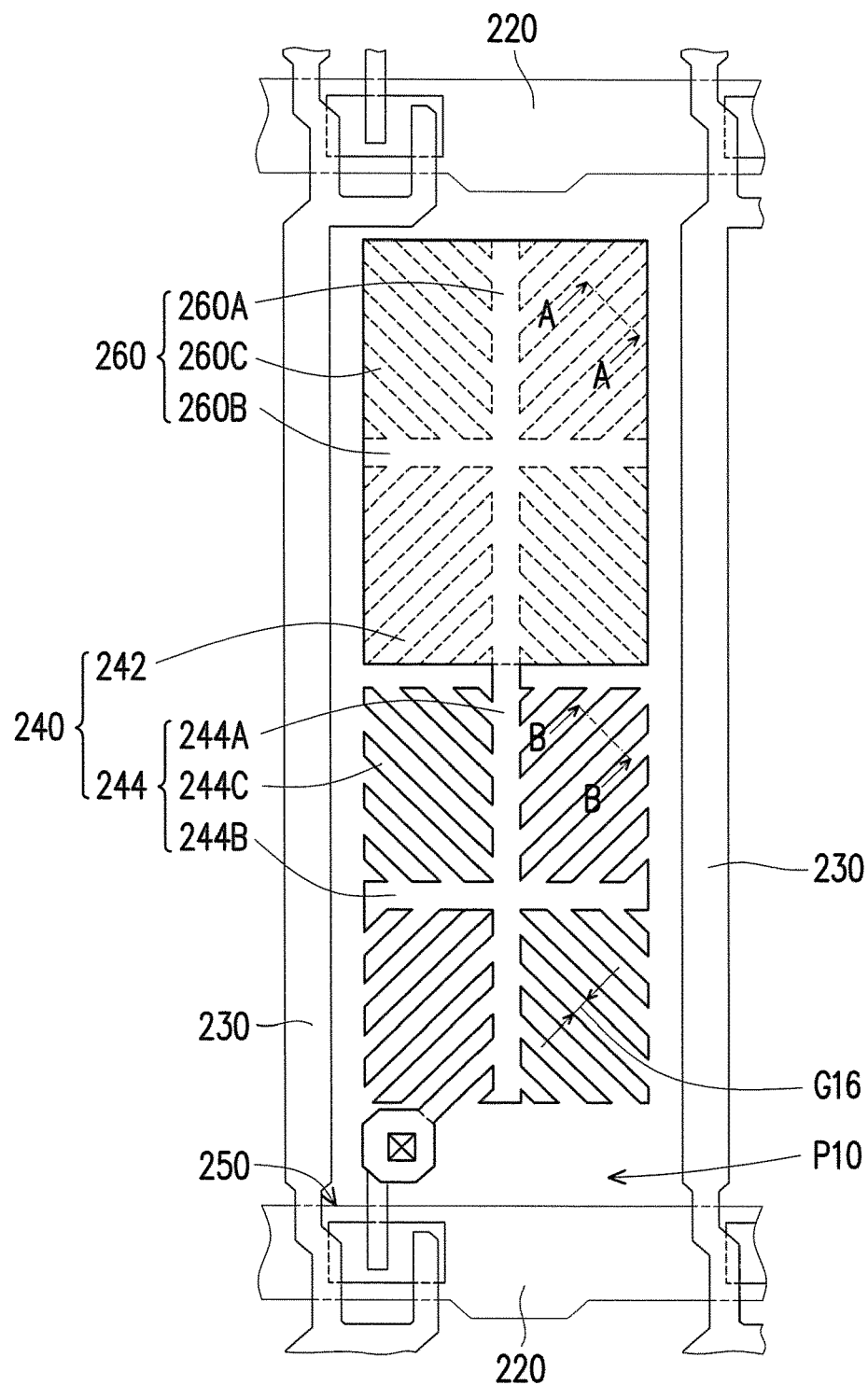
FIG. 2 is a top view of a single sub-pixel area of the display device of FIG. 1.

FIG. 1 is a cross-sectional simplified schematic view of a display device according to one embodiment of the disclosure. FIG. 2 is a top view of a single sub-pixel area of the display device of FIG. 1. Referring to FIGS. 1 and 2, a display device 200 according to one embodiment of the disclosure includes a first substrate 210, at least two scan lines 220, at least two data lines 230, at least a pixel electrode 240, at least an active component 250, a first interlayer 260, a second substrate 270, a common electrode layer 280, and a display medium layer 290. FIG. 2 only illustrates one single sub-pixel area. Upon referring to FIG. 2, an arrangement of at least two or more scan lines 220, at least two or more data lines 230, a plurality of pixel electrodes 240, and a plurality of active components 250 are not be repeated here. The scan lines 220, the data lines 230, the pixel electrode 240, and the active component 250 are all disposed over the first substrate 210. Adjacent two of the scan lines 220 and adjacent two of the data lines 230 intersect to define a sub-pixel area P10. The active component 250 is electrically connected to one of the scan lines 220. The pixel electrode 240 is electrically connected to the active component 250 and can receive data signal sent from the data lines 230. The common electrode layer 280 is disposed over the second substrate 270. The display medium layer 290 is disposed between the first substrate 210 and the second substrate 270 (in other words, between the first substrate 210 and the common electrode layer 280). When a threshold voltage is inputted through the scan lines 220 to turn on the active component 250, the data signal sent by the data lines 240 can be sent to the pixel electrode 240 via the active component 250. Through an electric field generated by a voltage difference between the pixel electrode 240 and the common electrode layer 280, the display medium layer 290 is driven to control transmittance variations and thereby generate display effect.

Figure 3A:
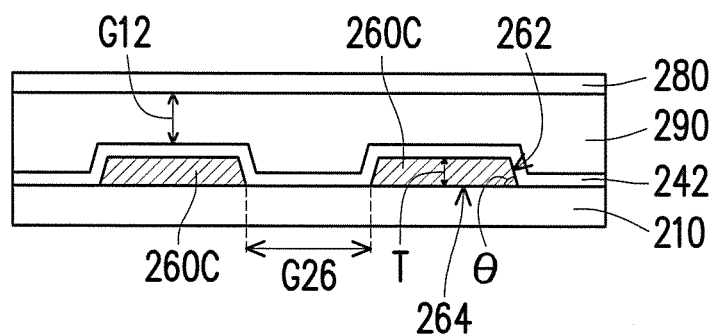
FIG. 3A and FIG. 3B are respectively cross-sectional schematic views along lines AA and BB in FIG. 2.
Figure 3B:
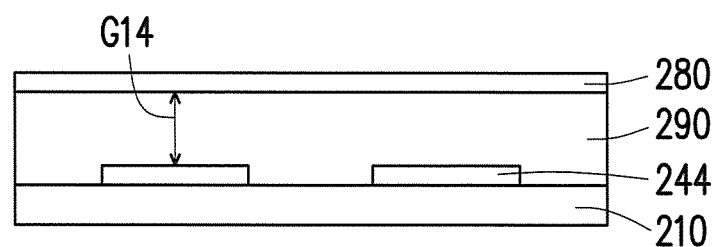

Referring to FIG. 2, the pixel electrode 240 includes a first pixel electrode 242 and a second pixel electrode 244 substantially having the same electric potential. In the present embodiment, the first pixel electrode 242 and the second pixel electrode 244 are directly connected to each other. However, the first pixel electrode 242 and the second pixel electrode 244 may also be electrically connected via other conductive paths, as long as the first pixel electrode 242 and the second pixel electrode 244 substantially have the same electric potential. FIG. 3A and FIG. 3B are respectively cross-sectional schematic views along lines AA and BB in FIG. 2. Referring to FIG. 2 and FIGS. 3A and 3B, the first interlayer 260 is formed between the first substrate 210 and the first pixel electrode 242 of the pixel electrode 240. The pixel electrode 240 is positioned between the first substrate 210 and the display medium layer 290. Due to the first interlayer 260, a minimum vertical distance between the first pixel electrode 242 and the common electrode layer 280 is a first distance G12, a minimum vertical distance between the second pixel electrode 244 and the common electrode layer 280 is a second distance G14, the first distance G12 is different from the second distance G14. Since the first distance G12 is different from the second distance G14, the electric field applied to the display medium layer 290 corresponding to the first pixel electrode 242 is also different from the electric field applied to the display medium layer 290 corresponding to the second pixel electrode 244, which causes a difference in the transmittance of the display medium layer 290 corresponding to the first pixel electrode 242 and corresponding to the second pixel electrode 244. Accordingly, a color difference as viewed from a direct viewing angle and from a side viewing angle can be reduced, and issues of color shift and insufficient color saturation that exist in the current wide viewing angle technology can be further improved. Moreover, it is not necessary to provide additional active components and relevant driving circuit, or thus a decrease in an aperture ratio of the display device can be avoided without causing difficulty in driving.

For example, the display medium layer 290 may be a liquid crystal layer. Since the first distance G12 is different from the second distance G14, the electric field applied to the liquid crystal molecules of the display medium layer 290 corresponding to the first pixel electrode 242 is also different from the electric field applied to the liquid crystal molecules of the display medium layer 290 corresponding to the second pixel electrode 244, which causes a difference in a tilt angle of the liquid crystal molecules corresponding to the first pixel electrode 242 and corresponding to the second pixel electrode 244. Accordingly, color difference as viewed from a direct viewing angle and from a side viewing angle can be reduced, and issues of color shift and insufficient color saturation that exist in the current wide viewing angle technology can be further improved.

Figure 4:
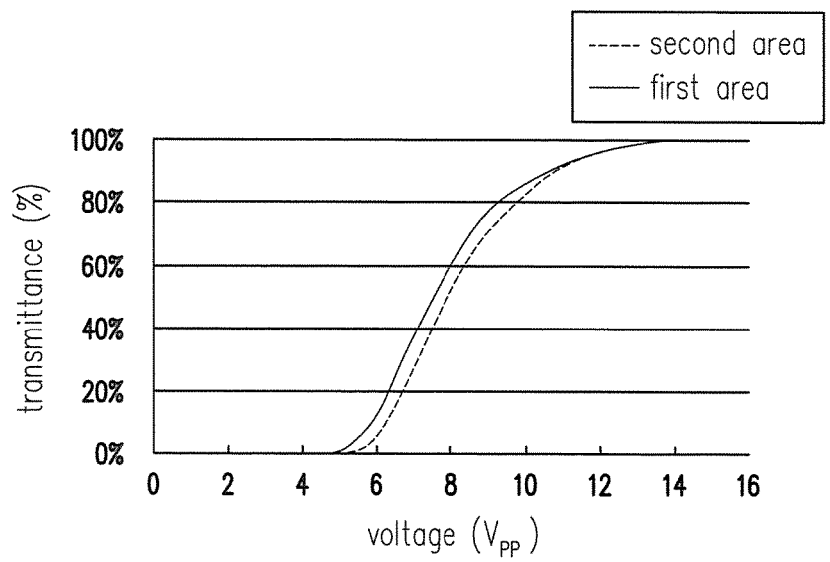
FIG. 4 is a comparative diagram of a voltage-transmittance relation after driving liquid crystal molecules of a first pixel electrode and a second pixel electrode of a pixel electrode in FIG. 1.
Figure 5:
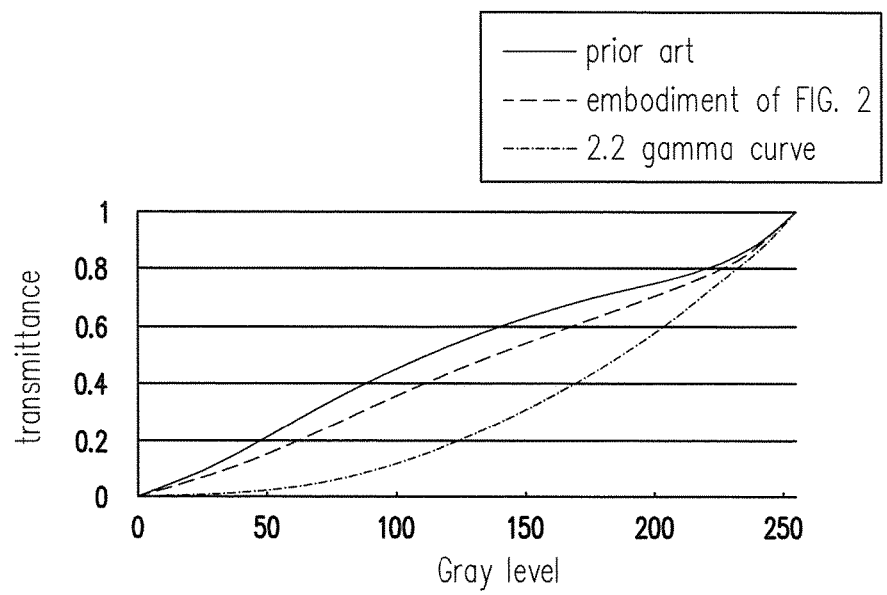
FIG. 5 is a comparative diagram of gamma curves of the display device of FIG. 1 and a liquid crystal display device in the prior art.

FIG. 4 is a comparative diagram of a voltage-transmittance relation after driving the liquid crystal molecules corresponding to the first pixel electrode and the second pixel electrode in FIG. 1. FIG. 4 clearly shows that a voltage-transmittance curve of a part of the liquid crystal molecules driven by the first pixel electrode is different from a voltage-transmittance curve a part of the liquid crystal molecules driven by the second pixel electrode. The voltage-transmittance curve of the first pixel electrode is shifted leftward from the voltage-transmittance curve of the second pixel electrode. It is implied the first pixel electrode has a lower threshold voltage than the second pixel. FIG. 5 is a comparative diagram of gamma curves of the display device of FIG. 1 and a liquid crystal display device in the prior art. FIG. 5 shows that a gamma curve of the display device of FIG. 1 is closer to an ideal gamma curve 2.2 when compared with a gamma curve of the liquid crystal display device in the prior art. This proves that the design of the display device of the present embodiment can indeed achieve the purposes of mitigating the color shift phenomenon and enhancing color saturation.

The following describes other selective variations of the technical means of the disclosure, but the disclosure is not limited hereto.

A material of the first interlayer 260 is selectively a light-transmitting material. On the other hand, the material of the first interlayer 260 may be an insulating material, such as silicon oxide (SiOx) or silicon nitride (SiNx), but the disclosure is not limited hereto. The material of the first interlayer 260 may also be an electrically conductive material, such as indium tin oxide (ITO). A material of the pixel electrode 240 is selectively a light-transmitting material, such as indium tin oxide (ITO), indium zinc oxide (IZO), aluminum doped zinc oxide (AZO), cadmium tin oxide (CTO), tin oxide (SnO2), zinc oxide (ZnO), etc. A material of the common electrode layer 280 is selected to be the same as that of the pixel electrode 240. Moreover, the material of the first interlayer 260 may also be the same as the material of the pixel electrode 240. What is important is to configure the first distance G12 between the first pixel electrode 242 and the common electrode layer 280 to be different from the second distance G14 between the second pixel electrode 244 and the common electrode layer 280.

Figure 6:
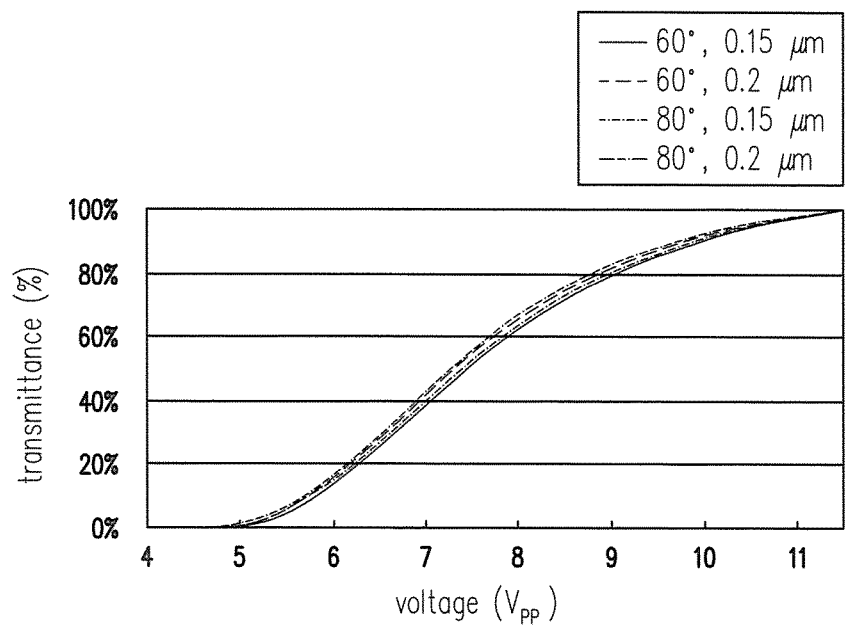
FIG. 6 is a comparative diagram of a voltage-transmittance relation after the liquid crystal molecules are driven as an included angle at a bottom of an edge of an interlayer and a thickness of the interlayer vary.

Referring to FIG. 3A, a thickness T of the first interlayer 260 is between 0.1 μm and 0.4 μm, Specifically, the first interlayer 260 includes a sidewall 262 and a bottom surface 264 connected to the sidewall 262. The included angle θ between the sidewall 262 and the bottom surface 264 is between 40° and 90°. FIG. 6 is a comparative diagram of a voltage-transmittance relation after the liquid crystal molecules are driven as the included angle and the thickness of the interlayer vary. FIG. 6 shows that as the thickness of the interlayer increases, the voltage-transmittance curve of the first pixel electrode moves leftward, which further widens a distance between the voltage-transmittance curve of the first pixel electrode and the voltage-transmittance curve of the second pixel electrode in FIG. 4, and results in an improved effect of mitigating color shift. Moreover, as the included angle formed between the sidewall and the bottom surface of the interlayer increases, the voltage-transmittance curve of the first pixel electrode also moves leftward, which similarly further widens the distance between the voltage-transmittance curve of the second pixel electrode and the voltage-transmittance curve of the first pixel electrode, and results in an improved effect of mitigating color shift.

Next, referring to FIG. 2, a portion of the first interlayer 260 positioned between the first pixel electrode 242 and the first substrate includes a first main trunk 260A, a second main trunk 260B, and a plurality of first strip-shaped branches 260C. The first main trunk 260A intersects with the second main trunk 260B, and an included angle of the two may be 90° or another appropriate angle. The first strip-shaped branches 260C are arranged in parallel in four areas divided by the first main trunk 260A and the second main trunk 260B, and an included angle between one of the first strip-shaped branches 260C and one of the first main trunk 260A and the second main trunk 260B is between 25°~65°. For example, in FIG. 2, the first strip-shaped branches 260C in the upper-right area divided by the first main trunk 260A and the second main trunk 260B are arranged in parallel at an azimuth angle of 25° to 65°, the first strip-shaped branches 260C in the lower-right area are arranged in parallel at an azimuth angle of 295° to 340°, the first strip-shaped branches 260C in the lower-left area are arranged in parallel at an azimuth angle of 205° to 245°, and the first strip-shaped branches 260C in the upper-left area are arranged in parallel at an azimuth angle of 115° to 155°. Referring to FIG. 3, adjacent two of the first strip-shaped branches 260C form a first gap G26 to expose part of the first substrate 210. It have to say that "a first gap G26 to expose part of the first substrate" means the gap G26 is formed by hollowing out part of the first interlayer to expose part of a layer under than the first interlayer, for example, if the first substrate 210 includes a buffer layer (no shown in the figure) and the buffer layer is directly contacted with the first interlayer, the first gap G26 exposes the buffer layer is one of an embodiment of this disclosure. In another words, the first substrate no only implied a single plate like glass or flexible plate, but also implied the other layers disposed over the glass or flexible plate. The portion of the first interlayer 260 under each first pixel electrode 242 is approximately in a Union Jack-like pattern. In this embodiment, first pixel electrode 242 is in a rectangular shape, but in another embodiment, first pixel electrode 242 may also be in other shapes depending on a shape of the sub-pixel area P10. The first pixel electrode 242 covers the first main trunk 260A, the second main trunk 260B, and the first strip-shaped branches 260C, and extends to cover the first gap G26. Since the first pixel electrode 242 is positioned over the first interlayer 260 in a Union Jack-like pattern, a topology of the first pixel electrode 242 varies as the a topology of the first interlayer, so the first pixel electrode 242 has different height from the first substrate, part of the first pixel electrode 242 with higher height is in a Union Jack-like pattern, which further causes the liquid crystal molecules to have a variety of tilt directions and achieves the purpose of a wide viewing angle. Since the first pixel electrode 242 of the pixel electrode 240 is in a complete shape and does not include slits, a phenomenon of dark stripes existing in display can be mitigated. Each second pixel electrode 244 of the present embodiment includes a third main trunk 244A, a fourth main trunk 244B, and a plurality of second strip-shaped branches 244C. The third main trunk 244A intersects with the fourth main trunk 244B, and an included angle of the two is 90° or another appropriate angle. The second strip-shaped branches 244C are arranged in parallel in four areas divided by the third main trunk 244A and the fourth main trunk 244B, and an included angle between one of the second strip-shaped branches 244C and one of the third main trunk 244A and the fourth main trunk 244B is between 25°~65°. For example, in FIG. 2, the second strip-shaped branches 244C in the upper-right area divided by the third main trunk 244A and the fourth main trunk 244B are arranged in parallel at an azimuth angle of 25° to 65°, the second strip-shaped branches 244C in the lower-right area are arranged in parallel at an azimuth angle of 295° to 335°, the second strip-shaped branches 244C in the lower-left area are arranged in parallel at an azimuth angle of 205° to 245°, and the second strip-shaped branches 244C in the upper-left area are arranged in parallel at an azimuth angle of 115° to 155°. The second pixel electrode 244 is approximately in a Union Jack-like pattern.

Figure 7:
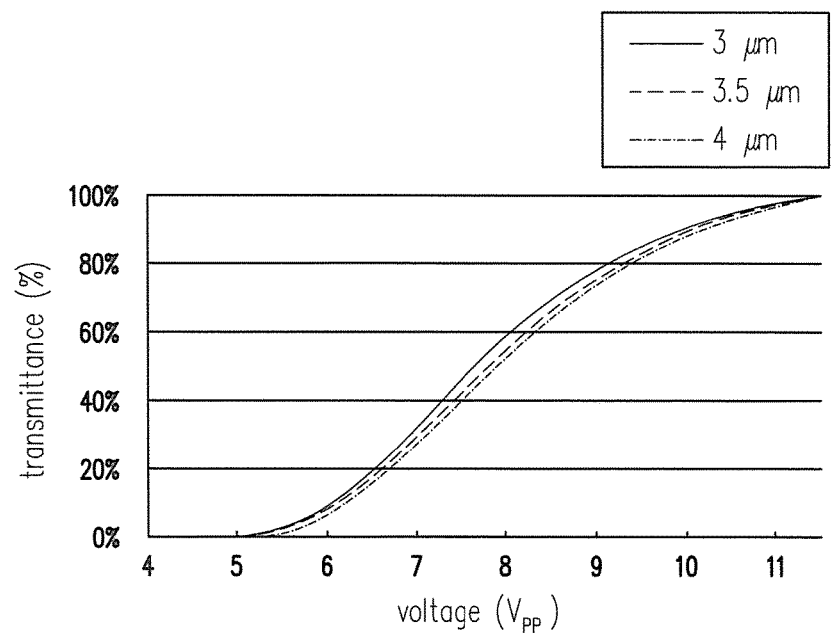
FIG. 7 is a comparative diagram of a voltage-transmittance relation after the liquid crystal molecules are driven as a gap between second strip-shaped branches of the second pixel electrode of the pixel electrode varies.

The first interlayer 260 of the present embodiment includes a plurality of portions separate from each other and is distributed under each first pixel electrode 242. What is important is that, due to the first interlayer 260, the first distance G12 between the first pixel electrode 242 and the common electrode layer 280 is different from the second distance G14 between the second pixel electrode 244 and the common electrode layer 280, as FIG. 3A shows. In the present embodiment, a second gap G16 between the strip-shaped branches 244C of the second pixel electrode 244 is between 3 μm and 10 μm and exposes the first substrate 210. FIG. 7 is a comparative diagram of a voltage-transmittance relation after the liquid crystal molecules are driven as the gap between the strip-shaped branches of the second pixel electrode of the pixel electrode varies. FIG. 7 shows that as the gap between the strip-shaped branches of the second pixel electrode increases, the voltage-transmittance curve of the second pixel electrode moves rightward, which further widens a distance between the voltage-transmittance curve of the first pixel electrode and the voltage-transmittance curve of the second pixel electrode in FIG. 4 and results in an improved effect of mitigating color shift.

Figure 8A:
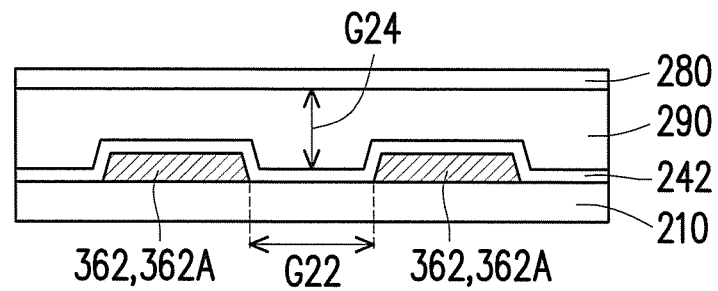
FIG. 8A and FIG. 8B are respectively cross-sectional schematic views at the first pixel electrode and the second pixel electrode of the pixel electrode of the display device according to another embodiment of the disclosure.
Figure 8B:
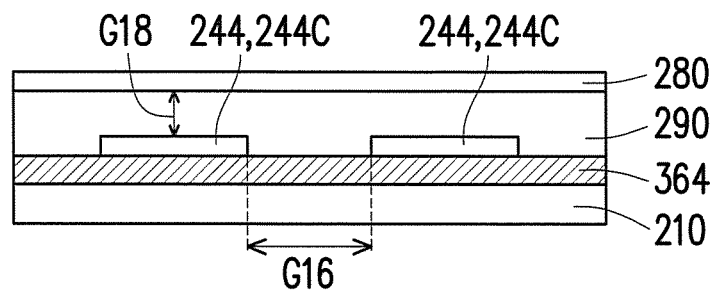

FIG. 8A and FIG. 8B are respectively cross-sectional schematic views at the first pixel electrode and the second pixel electrode of the pixel electrode of the display device according to another embodiment of the disclosure. Referring to FIGS. 8A and 8B, the display device of the present embodiment is similar to that of the embodiment of FIGS. 3A and 3B, and the differences between the two are described here. FIG. 8A is basically identical to FIG. 3A, while in FIG. 8B, the interlayer includes a first interlayer 362 and a second interlayer 364. Materials of the first interlayer 362 and the second interlayer 364 are similar to that of the first interlayer 260 in FIG. 2. A shape and a position of the first interlayer 362 are also similar to those of the first interlayer 260 in FIG. 2 (namely, being between the first pixel electrode 242 and the first substrate 210). The first interlayer 362 includes a plurality of first strip-shaped branches 362A. Adjacent two of the first strip-shaped branches 362A form a first gap G22 to expose part of the first substrate 210. It have to say that "a first gap G22 to expose part of the first substrate" means the gap G22 is formed by hollowing out part of the first interlayer to expose part of a layer under than the first interlayer, for example, if the first substrate 210 includes a buffer layer (no shown in the figure) and the buffer layer is directly contacted with the first interlayer, the first gap G22 exposes the buffer layer is one of an embodiment of this disclosure. In another words, the first substrate no only implied a single plate like glass or flexible plate, but also implied the other layers disposed over the glass or flexible plate. The first pixel electrode 242 extends to cover the first gap G22. The second interlayer 364 is fully distributed under the second pixel electrode 244. In other words, the second pixel electrode 244 is raised in entirety by the second interlayer 364. The second gap G16 between the second strip-shaped branches 244C of the second pixel electrode 244 exposes part of the second interlayer 364. However, due to the first interlayer 362 and the second interlayer 364, a maximum vertical distance between the first pixel electrode 242 and the common electrode layer 280 is a first distance G24, a maximum vertical distance between the second pixel electrode 244 and the common electrode layer 280 is a second distance G18, the first distance G24 is still different from the second distance G18. A difference between the first distance G24 and the second distance G18 is 0.1 μm to 0.4 μm. Accordingly, the display device of the present embodiment similarly improves issues of color shift and insufficient color saturation that exist in the current wide viewing angle technology or can avoid a decrease in an aperture ratio of the display device without causing difficulty in driving. Moreover, as the second maximum distance G18 between the second pixel electrode 244 and the common electrode layer 280 is decreased, the wide viewing angle effect further becomes more significant.

In light of the above, the entire pixel electrode in the sub-pixel area has the same electric potential. However, the arrangement of the interlayer enables the distance between the first pixel electrode of the pixel electrode and the common electrode layer to be different from the distance between the second pixel electrode of the pixel electrode and the common electrode layer. Accordingly, without providing additional active components and relevant driving circuits, brightness presented by the first pixel electrode and that by the second pixel electrode can still be different. Thereby, the issues of color shift and insufficient color saturation can be mitigated, and meanwhile a process yield rate or the aperture ratio of the display device can be improved.

Lastly, it should be noted that the embodiments above are merely meant to describe the technical solutions of the disclosure rather than limit the disclosure. Although the embodiments above have described the disclosure in detail, any person skilled in the art shall understand that he or she may still make modifications to the technical solutions recited in the embodiments above or make equivalent replacements of part or all of the technical features therein. The modifications and replacements do not cause the nature of the corresponding technical solutions to depart from the scope of the technical solutions of the embodiments of the disclosure.

What is claimed is:

1. A display device comprising:
   a first substrate;
   at least two scan lines, at least two data lines, at least a pixel electrode, and at least an active component, disposed over the first substrate, wherein adjacent two of the scan lines and adjacent two of the data lines intersect to define a sub-pixel area, the active component is electrically connected to one of the scan lines, the pixel electrode is electrically connected to the active component, and the pixel electrode comprises a first pixel electrode and a second pixel electrode having the same electric potential;
   a first interlayer disposed between the first substrate and the first pixel electrode, wherein the first interlayer comprises a plurality of first strip-shaped branches, wherein adjacent two of the first strip-shaped branches form a first gap to expose part of the first substrate;
   a second substrate;
   a common electrode layer disposed over the second substrate; and
   a display medium layer disposed between the first substrate and the second substrate, wherein the pixel electrode is positioned between the first substrate and the display medium layer, the first pixel electrode extends to cover the first gap, a maximum vertical distance between the first pixel electrode and the common electrode layer is a first distance, a maximum vertical distance between the second pixel electrode and the common electrode layer is a second distance, and a difference between the first distance and the second distance is 0.1 μm to 0.4 μm.

2. The display device according to claim 1, wherein the second pixel electrode comprises a plurality of second strip-shaped branches, wherein adjacent two of the second strip-shaped branches form a second gap.

3. The display device according to claim 2, further comprising a second interlayer disposed between the first substrate and the second pixel electrode.

4. The display device according to claim 3, wherein the second gap exposes part of the second interlayer.

5. The display device according to claim 3, wherein a material of at least one of the first interlayer and the second interlayer is identical to a material of the pixel electrode.

6. The display device according to claim 3, wherein a material of at least one of the first interlayer and the second interlayer is an insulating material.

7. The display device according to claim 3, wherein the first interlayer further includes a first main trunk and a second main trunk, the first main trunk and the second main trunk intersects, each of the first strip-shaped branches connects to one of the first main trunk and the second main trunk, an included angle between one of the first strip-shaped branches and one of the first main trunk and the second main trunk is between 25° and 65°.

8. The display device according to claim 2, wherein the second pixel electrode includes a third main trunk and a fourth main trunk, the third main trunk and the fourth main trunk intersects, each of the second strip-shaped branches connects to one of the third main trunk and the fourth main trunk, an included angle between one of the second strip-shaped branches and one of the third main trunk and the fourth main trunk is between 25° and 65°.

9. The display device according to claim 1, wherein the first pixel electrode directly connects to the second pixel electrode.

10. The display device according to claim 1, wherein the first interlayer comprises a sidewall and a bottom surface connected to the sidewall, an included angle between the sidewall and the bottom surface being between 40° and 90°.

11. A display device comprising:
    a first substrate;
    at least two scan lines, at least two data lines, at least a pixel electrode, and at least an active component, disposed over the first substrate, wherein adjacent two of the scan lines and adjacent two of the data lines intersect to define a sub-pixel area, the active component is electrically connected to one of the scan lines, the pixel electrode is electrically connected to the active component, and the pixel electrode comprises a first pixel electrode and a second pixel electrode having the same electric potential;
    a first interlayer formed between the first substrate and the first pixel electrode of the pixel electrode, wherein the first interlayer comprises a plurality of first strip-shaped branches, wherein adjacent two of the first strip-shaped branches form a first gap to expose part of the first substrate;
    a second substrate;
    a common electrode layer disposed over the second substrate; and
    a display medium layer disposed between the first substrate and the second substrate, wherein the pixel electrode is positioned between the first substrate and the display medium layer, the first pixel electrode extends to cover the first gap, the second pixel electrode comprises a plurality of second strip-shaped branches, wherein adjacent two of the second strip-shaped branches form a second gap, and a minimum vertical distance between the first pixel electrode and the common electrode layer is a first distance, a minimum vertical distance between the second pixel electrode and the common electrode layer is a second distance, the first distance is different from the second distance.

12. The display device according to claim 11, a difference between the first distance and the second distance is 0.1 μm to 0.4 μm.

13. The display device according to claim 11, wherein the second gap is between 3 μm and 10 μm.

14. The display device according to claim 11, wherein a thickness of the first interlayer is between 0.1 μm and 0.4 μm.

15. The display device according to claim 11, wherein the first interlayer comprises a sidewall and a bottom surface connected to the sidewall, an included angle between the sidewall and the bottom surface being between 40° and 90°.

16. The display device according to claim 11, wherein the first interlayer further includes a first main trunk and a second main trunk, the first main trunk and the second main trunk intersects, each of the first strip-shaped branches connects to one of the first main trunk and the second main trunk, an included angle between one of the first strip-shaped branches and one of the first main trunk and the second main trunk is between 25° and 65°.

17. The display device according to claim 11, wherein the second pixel electrode includes a third main trunk and a fourth main trunk, the third main trunk and the fourth main trunk intersects, each of the second strip-shaped branches connects to one of the third main trunk and the fourth main trunk, an included angle between one of the second strip-shaped branches and one of the third main trunk and the fourth main trunk is between 25° and 65°.

18. The display device according to claim 11, the first pixel electrode directly connects to the second pixel electrode.

* * * * *